(12) United States Patent
Cullen et al.

(10) Patent No.: US 6,467,254 B1
(45) Date of Patent: Oct. 22, 2002

(54) DIAGNOSTIC SYSTEM FOR DETECTING CATALYST FAILURE USING SWITCH RATIO

(75) Inventors: Michael John Cullen, Northville; Brent Edward Sealy, Dearborn; Kenneth John Behr, Farmington Hills; Richard Andrew Booth, Canton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/488,932

(22) Filed: Jan. 20, 2000

(51) Int. Cl.[7] .................................................. F01N 3/00
(52) U.S. Cl. .......................................... 60/274; 60/277
(58) Field of Search ........................ 60/274, 276, 277, 60/285; 123/688, 690, 691, 692

(56) References Cited

U.S. PATENT DOCUMENTS

| | | |
|---|---|---|
| 5,074,113 A | 12/1991 | Matsuoka |
| 5,207,057 A | 5/1993 | Kayanuma .................. 60/276 |
| 5,228,287 A | 7/1993 | Kuronishi et al. |
| 5,233,829 A | 8/1993 | Komatsu |
| 5,247,793 A | 9/1993 | Yamada et al. |
| 5,255,512 A | 10/1993 | Hamburg et al. |
| 5,279,114 A | 1/1994 | Kurita et al. |
| 5,282,360 A | 2/1994 | Hamburg et al. |
| 5,357,751 A | 10/1994 | Orzel |
| 5,359,852 A | 11/1994 | Curran et al. |
| 5,377,484 A | 1/1995 | Shimizu |
| 5,394,691 A | 3/1995 | Seki |
| 5,417,058 A | 5/1995 | Shimizu |
| 5,450,837 A | 9/1995 | Uchikawa |
| 5,485,382 A | 1/1996 | Seki et al. |
| 5,511,377 A | 4/1996 | Kotwicki |
| 5,570,574 A | 11/1996 | Yamashita et al. |
| 5,704,339 A | 1/1998 | Choe et al. |
| 5,706,793 A | 1/1998 | Orzel et al. |
| 5,749,221 A | 5/1998 | Kawahira et al. |
| 5,894,727 A | 4/1999 | Zimlich |
| 5,899,062 A | 5/1999 | Jerger et al. |
| 5,979,160 A | * 11/1999 | Yashiki et al. ................. 60/276 |
| 6,138,452 A | * 10/2000 | Davey et al. .................. 60/274 |
| 6,151,889 A | * 11/2000 | Davey et al. .................. 60/277 |

OTHER PUBLICATIONS

U.S.P.A. for "Method And System For Compensating For Degraded Pre–Catalyst Oxygen Sensor In A Two–Bank Exhaust System" filed on the same date hereof; Inventors: Booth, et al.; Attorney Docket No. 198–0963 (65080–0005).

U.S.P.A. for "Method And System For Controlling Air/Fuel Level In Two–Bank Exhaust System" filed on the same date hereof; Inventors: Booth, et al., Attorney Docket No. 199–1619 (65080–0006).

(List continued on next page.)

Primary Examiner—Thomas Denion
Assistant Examiner—Tu M. Nguyen
(74) Attorney, Agent, or Firm—John F. Buckert

(57) ABSTRACT

A method and system for diagnosing catalyst operation in an internal combustion engine having a two-bank, three EGO sensor structure includes monitoring when the EGO sensors switch states between rich and lean and determining the ratio between a switch count of the post-catalyst EGO sensor signal and a switch count of a pre-catalyst EGO sensor signal over a selected time period. If the exhaust bank is a one-sensor bank having only a post-catalyst EGO sensor and not a pre-catalyst EGO sensor, the system uses the switch count from the pre-catalyst EGO sensor in the two-sensor bank to calculate the switch ratio, thereby allowing calculation of two switch ratios without two matched pairs of EGO sensors. The switch ratio indicates the efficiency of the catalyst and may be compared with later-generated ratios to monitor converter efficiency over time.

14 Claims, 4 Drawing Sheets

OTHER PUBLICATIONS

U.S.P.A. for "Method And System For Controlling Air/Fuel Level For Internal Combustion Engine With Two Exhaust Banks" filed on the same date hereof; Inventors: Booth, et al.; Attorney Docket No. 199–1772 (65080–0007).

U.S.P.A. for "Method For Controlling Air/Fuel Mixture" filed on the same date hereof; Inventors: Booth, et al.; Attorney Docket No. 199–1803 (65080–0008).

U.S.P.A. for "Diagnostic System For Monitoring Catalyst Operation Using Arc Length Ratio" filed on the same date hereof; Inventors: Booth, et al.; Attorney Docket No. 199–1790 (65080–0010).

* cited by examiner

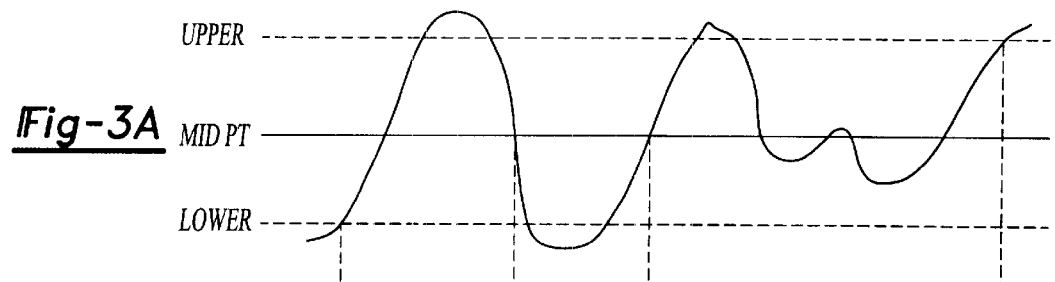
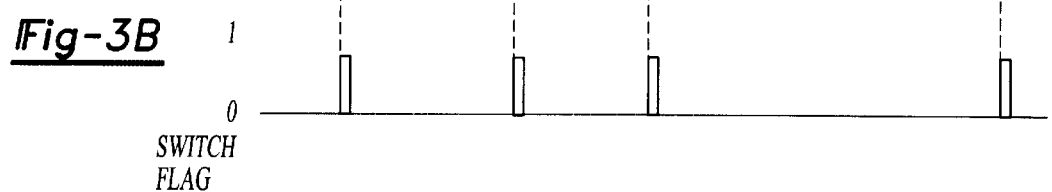
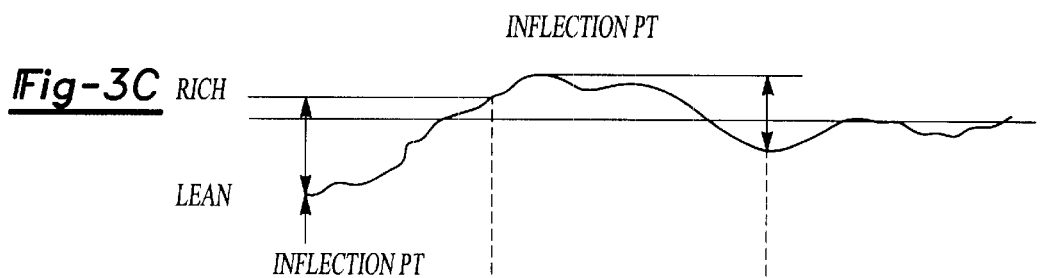

DIAGNOSTIC SYSTEM FOR DETECTING CATALYST FAILURE USING SWITCH RATIO

TECHNICAL FIELD

The present invention is directed to a system for monitoring catalyst operation in an internal combustion engine having a two-bank exhaust system. More particularly, the invention is directed to a diagnostic system that monitors catalyst efficiency by comparing signals between a pre-catalyst EGO sensor and a post-catalyst EGO sensor in two different banks.

BACKGROUND ART

To meet current emission regulations, automotive vehicles must regulate the air/fuel ratio (A/F) supplied to the vehicles' cylinders so as to achieve maximum efficiency of the vehicles' catalysts. For this purpose, it is known to control the air/fuel ratio of internal combustion engines using an exhaust gas oxygen (EGO) sensor positioned in the exhaust stream from the engine. The EGO sensor provides feedback data to an electronic controller that calculates preferred A/F values over time to achieve optimum efficiency of a catalyst in the exhaust system. More particularly, the EGO sensor feedback signals are used to calculate desired A/F ratios via a jumpback and ramp process, which is known in the art.

It is also known to have systems with two EGO sensors in a single exhaust stream in an effort to achieve more precise A/F control with respect to the catalyst window. Normally, a pre-catalyst EGO sensor is positioned upstream of the catalyst and a post-catalyst EGO sensor is positioned downstream of the catalyst. Finally, in connection with engines having two groups of cylinders, it is known to have a two-bank exhaust system coupled thereto where each exhaust bank has its own catalyst as well as its own pre-catalyst and post-catalyst EGO sensors.

It is known in the art to monitor the efficiency of a catalyst by determining the switch ratio between signals generated by corresponding pre-catalyst and post-catalyst EGO sensors in the same exhaust stream and connected to the same catalyst. This type of system is described in U.S. Pat. No. 5,357,751 to Orzel entitled "Air/Fuel Control System Providing Catalytic Monitoring," the disclosure of which is incorporated herein by reference.

Sometimes, in a two-bank, four-EGO sensor exhaust system, one of the pre-catalyst EGO sensors degrades. In other circumstances, it is desirable to purposely eliminate one of the pre-catalyst EGO sensors in a two-bank system to reduce the cost of the system. In either event, it is desirable to be able to monitor the catalyst efficiency in the group of cylinders coupled to the exhaust bank having only one operational EGO sensor by using the signals received from the three operational EGO sensors alone. However, known methods for catalyst diagnosis require a matched set of pre-catalyst and post-catalyst EGO sensors in each bank, such as in a one-bank, two EGO sensor system or in a two-bank, four EGO sensor system, so that the switch counts between the corresponding pre-catalyst and post-catalyst sensors can be compared. Thus, for a two-bank, three EGO sensor system, only the catalyst in the two EGO sensor exhaust bank will be monitored and diagnosed, while the catalyst in the bank having only one operational EGO sensor will remain unmonitored.

There is a need for an improved system that can monitor the operation of a catalyst in a one-sensor bank even though the catalyst only has one EGO sensor coupled to it.

SUMMARY OF THE INVENTION

Accordingly, the present invention is directed toward a new system and method for monitoring the operation of both catalysts in an internal combustion engine having a group of cylinders coupled to two functioning EGO sensors (the "two-sensor bank") and another group of cylinders coupled to one functioning EGO sensor (the "one-sensor bank"). More particularly, the operation of the catalyst in the one-sensor bank is monitored and diagnosed based on a signal from a post-catalyst EGO sensor connected to the catalyst and a signal from a pre-catalyst EGO sensor in a different bank and connected to a different catalyst.

In a preferred embodiment of the invention, for a system that is missing a pre-catalyst EGO sensor in the one-sensor bank, the signal from the pre-catalyst EGO sensor in the two-sensor bank is used to calculate a diagnostic signal for the catalyst in the one-sensor bank. In essence, the invention assumes that a signal characteristic for the non-existent pre-catalyst EGO sensor in the one-sensor bank would be the same as the signal characteristic of the existing pre-catalyst EGO sensor in the two-sensor bank and calculates a diagnostic signal for the catalyst in the one-sensor bank accordingly. The diagnostic signal can be, for example, a ratio of the switch counts between the post-catalyst and pre-catalyst EGO sensor signals.

Once the switch ratios are calculated, the ratios can be compared with calibratable or experimentally-generated ratios to monitor the catalyst efficiency over time. As a result, the invention can monitor and diagnose the operation of the catalysts in both the one-sensor bank and the two-sensor bank even though the one-sensor bank does not have a matched pair of EGO sensors.

BRIEF DESCRIPTION OF THE DRAWINGS

FIGS. 3a through 3d are graphs illustrating how EGO sensor switch counts are obtained;

DETAILED DESCRIPTION OF THE PREFERRED EMBODIMENT

Figure 1:
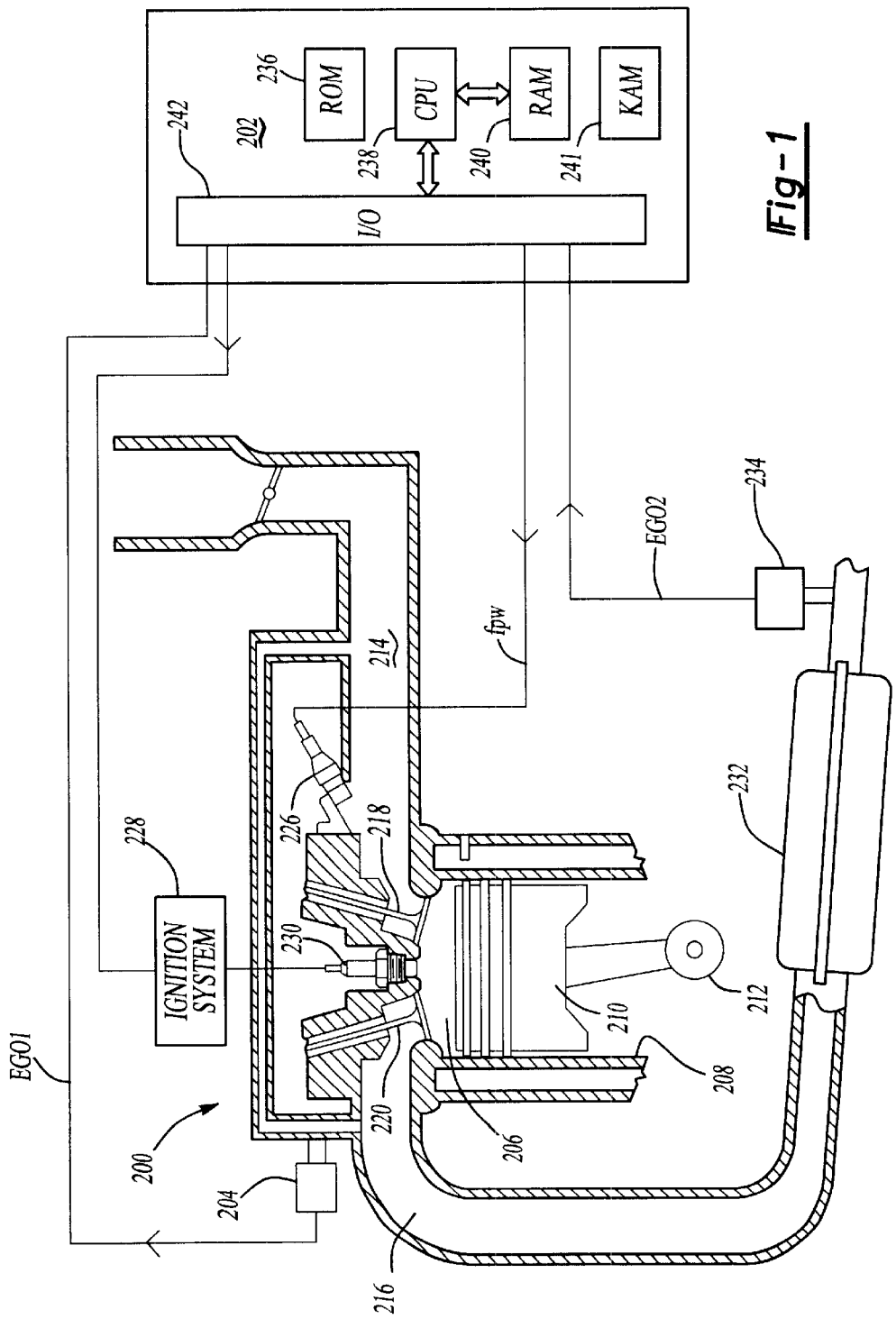
FIG. 1 illustrates an internal combustion engine according to a preferred embodiment of the invention.

FIG. 1 illustrates an internal combustion engine. Engine 200 generally comprises a plurality of cylinders, but, for illustration purposes, only one cylinder is shown in FIG. 1. Engine 200 includes combustion chamber 206 and cylinder walls 208 with piston 210 positioned therein and connected to crankshaft 212. Combustion chamber 206 is shown communicating with intake manifold 214 and exhaust manifold 216 via respective intake valve 218 and exhaust valve 220. As described later herein, engine 200 may include multiple exhaust manifolds with each exhaust manifold corresponding to a group of engine cylinders. Intake manifold 214 is also shown having fuel injector 226 coupled thereto for delivering liquid fuel in proportion to the pulse width of signal FPW from controller 202. Fuel is delivered to fuel injector 226 by a conventional fuel system (not shown) including a fuel tank, fuel pump, and fuel rail (not shown).

Conventional distributorless ignition system 228 provides ignition spark to combustion chamber 206 via spark plug 230 in response to controller 202. A first two-state EGO sensor 204 is shown coupled to exhaust manifold 216 upstream of catalyst 232. A second two-state EGO sensor 234 is shown coupled to exhaust manifold 216 downstream of catalyst 232. The upstream EGO sensor 204 provides a feedback signal EGO1 to controller 202 which converts signal EGO1 into two-state signal EGOS1. A high voltage state of signal EGOS1 indicates exhaust gases are rich of a reference A/F and a low voltage state of converted signal EGO1 indicates exhaust gases are lean of the reference A/F. The downstream EGO sensor 234 provides signal EGO2 to controller 202 which converts signal EGO2 into two-state signal EGOS2. A high voltage state of signal EGOS2 indicates that the engine is running rich, and a low voltage state of converted signal EGO1 indicates that the engine is running lean. Controller 202 is shown in FIG. 1 as a conventional microcomputer including: microprocessor unit 238, input/output ports 242, read only memory 236, random access memory 240, keep alive memory 241 and a conventional data bus.

Figure 2:
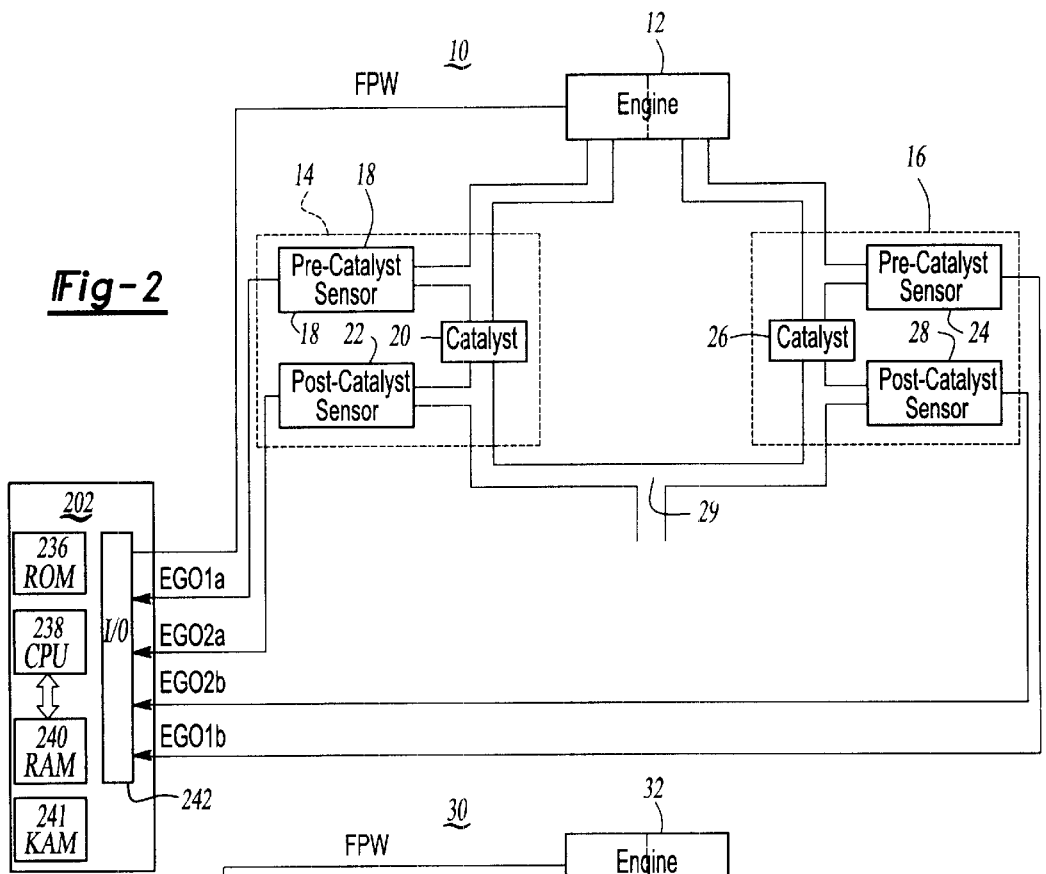
FIG. 2 is a block diagram representing a known two-bank exhaust system with each bank having pre-catalyst and post-catalyst EGO sensors.
Figure 4:
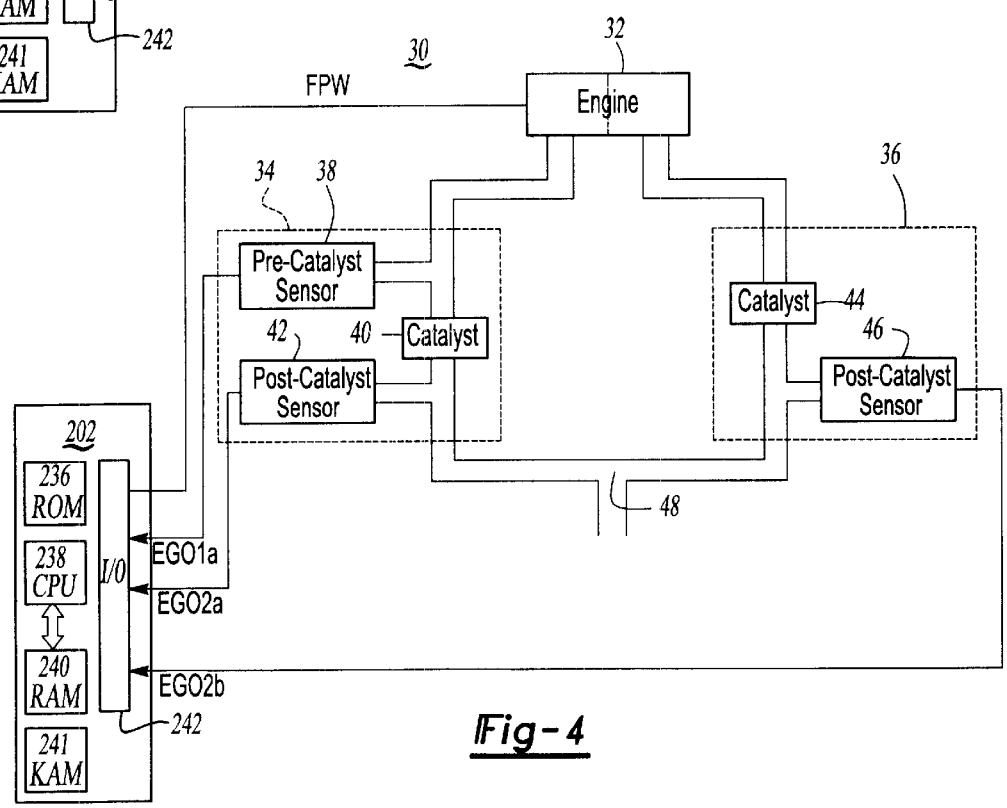
FIG. 4 is a block diagram representing a two-bank exhaust system wherein one bank has a pre-catalyst and a post-catalyst EGO sensor and the other bank has only a post-catalyst EGO sensor.

FIGS. 2 and 4 schematically illustrate different embodiments of a two-bank exhaust system to be used in the present invention. FIG. 2 shows a known two-bank, four EGO-sensor exhaust system. As illustrated in FIG. 2, exhaust gases flow from first and second groups of cylinders of engine 12 through a corresponding first exhaust bank 14 and second exhaust bank 16. Engine 12 is the same as or similar to engine 200 in FIG. 1. Exhaust bank 14 includes pre-catalyst EGO sensor 18, catalyst 20, and post-catalyst EGO sensor 22. Exhaust bank 16 includes pre-catalyst EGO sensor 24, catalyst 26 and post-catalyst EGO sensor 28. The pre-catalyst EGO sensors, catalysts, and post-catalyst EGO sensors in FIG. 2 are the same as or similar to pre-catalyst EGO sensor 204, catalyst 232, and post-catalyst EGO sensor 234 in FIG. 1.

In operation, when exhaust gases flow from engine 12 through exhaust bank 14, pre-catalyst EGO sensor 18 senses the emissions level in the exhaust gases passing through bank 14 before they enter catalyst 20 and provides feedback signal EGO1a to controller 202. After the exhaust gases pass through catalyst 20, post-catalyst EGO sensor 22 senses the emissions level in the exhaust gases after they exit the catalyst 20 and provides feedback signal EGO1b to controller 202. With respect to exhaust bank 16, pre-catalyst EGO sensor 24 senses the emissions level in the exhaust gases passing through bank 16 before they enter catalyst 26 and provides feedback signal EGO2a to controller 202. After the exhaust gases pass through catalyst 26, post-catalyst EGO sensor 28 senses the emissions level in the exhaust gases after they exit catalyst 26 and provides feedback signal EGO2b to controller 202. Then the exhaust gases are joined at junction 29 before being expelled from the system 10, though the disclosed invention is equally applicable to a system wherein the exhaust banks are kept separate throughout the entire system. Controller 202 uses feedback signals EGO1a, EGO1b, EGO2a, and EGO2b, which reflect the current operating conditions of the catalysts 20, 26, to calculate the switch count ratios for diagnosing catalyst operation. The controller shown in FIG. 2 is the same as or similar to controller 202 shown in FIG. 1.

Catalyst operation can be monitored by comparing selected signal characteristics, such as the switch count, of the signals from the pre-catalyst and post-catalyst EGO sensors connected to that catalyst. Although the present application focuses on calculating a catalyst diagnostic signal based on the switch counts of the EGO sensor signals, any signal characteristic can be used as long as one signal is from a pre-catalyst EGO sensor and the other signal is from a post-catalyst EGO sensor, even if the sensors are in different exhaust banks. One way in which the switch ratios are calculated for a two-sensor bank is explained in U.S. Pat. No. 5,357,751, which is incorporated herein by reference. The way in which switch counts are obtained for the pre-catalyst and post-catalyst EGO sensors will be summarized below.

FIGS. 3a and 3b illustrate how switch counts are obtained for the pre-catalyst EGO sensor, while FIGS. 3c and 3d illustrate how switch counts are obtained for the post-catalyst EGO sensor. With respect to the pre-catalyst EGO sensor, a switch flag is generated each time a signal from the pre-catalyst EGO sensor crosses two out of three threshold lines, as shown in FIGS. 3a and 3b. The signal threshold lines are preferably an upper limit threshold, a lower limit threshold, and a midpoint threshold associated with stoichiometry. With respect to the post-catalyst EGO sensor, a switch flag is generated each time a signal from the post-catalyst EGO sensor passes an inflection point and then moves a calibratable distance in the opposite direction, as shown in FIGS. 3c and 3d. In short, the switch flags indicate transition points at which the exhaust both upstream and downstream from the catalyst move a predetermined amount from rich to lean or from lean to rich. By comparing the number of switch counts between corresponding post-catalyst and pre-catalyst EGO sensors in the same exhaust stream, the catalyst efficiency can be determined, particularly if the switch ratio is compared with calibratable or experimentally determined thresholds.

FIG. 4 illustrates a two-bank exhaust system similar to that shown in FIG. 2, except that the pre-catalyst EGO sensor in one of the exhaust banks 36 is missing. Specifically, FIG. 4 illustrates that exhaust gases expelled from engine 32 pass through exhaust banks 34 and 36. In bank 34, the emissions level of the exhaust gases is sensed by pre-catalyst EGO sensor 38 before entering catalyst 40, and feedback signal EGO1a is provided to controller 202. After the exhaust gases exit catalyst 40, the emissions level is sensed by post-catalyst EGO sensor 42, and feedback signal EGO2a is provided to controller 202. With respect to exhaust bank 36, the exhaust gases expelled by engine 32 enter catalyst 44. After the exhaust gases exit catalyst 44, their oxygen content is sensed by post-catalyst EGO sensor 46, and feedback signal EGO2b is provided to controller 202. Then the exhaust gases are joined at junction 48 before being expelled from the system 30, though the disclosed invention is equally applicable to a system wherein the exhaust banks are kept separate throughout the entire system.

Figure 5:
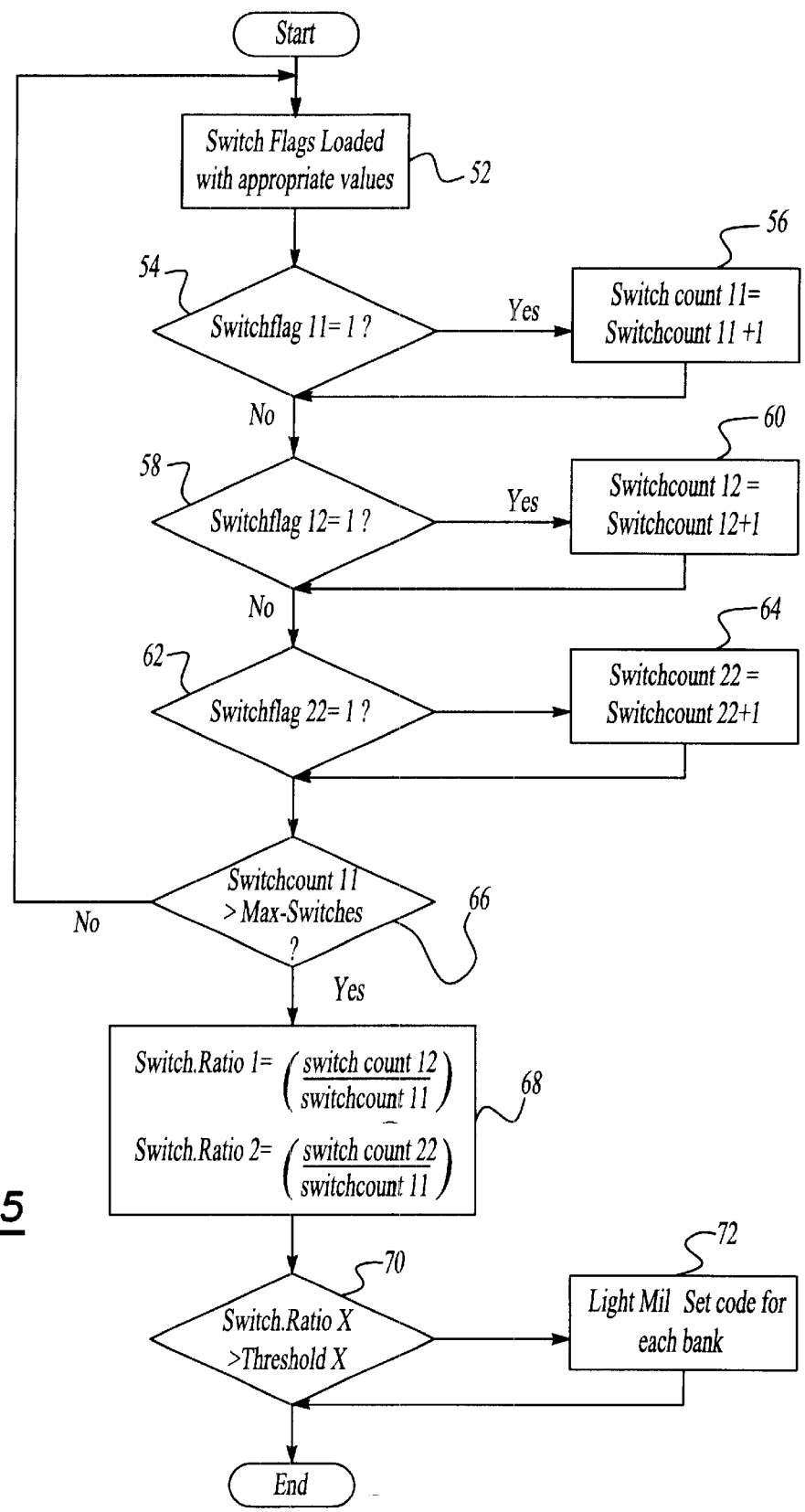
FIG. 5 is a flowchart describing the inventive method.

If the catalyst has both pre-catalyst and post-catalyst EGO sensors coupled to it, calculation of the switch ratio is conducted according to the method described in, for example, U.S. Pat. No. 5,357,751. If the catalyst has only one EGO sensor connected to it, however, the inventive system can still calculate the switch ratio for that sensor even in the absence of a matched EGO sensor pair. Referring to FIG. 5, the switch flags are first loaded with the appropriate predetermined values 52 as in known methods. The pre-catalyst EGO sensor in the two-sensor bank is then checked for a switched state; if the pre-catalyst EGO sensor has switched, the system increments an upstream counter 56. The checking and incrementing steps are repeated for the post-catalyst EGO sensor in the two-sensor bank 58, 60 and the post-catalyst EGO sensor in the one-sensor bank 62, 64.

The system then checks whether the pre-catalyst EGO sensor in the two-sensor bank has switched states a predetermined number of times 66. If not, the process repeats at step 54 to obtain more switch counts. If so, the switch ratios for both the one-bank and two-bank catalysts are calculated 68 and checked to see whether they exceed a preselected threshold 70, indicating deteriorating catalyst operation. If the switch ratio for either catalyst exceeds the threshold at step 70, a warning light can be activated 72 to notify the operator of the catalyst condition.

In short, the invention assumes that a signal characteristic, such as the switch count, of the missing pre-catalyst EGO sensor in the one-sensor bank would be the same as the switch count of the existing pre-catalyst EGO sensor in the two-sensor bank. This allows calculation of the switch ratios for both catalysts with only three measured switch counts instead of the four measured switch counts that are conventionally required in known methods. The switch count ratio calculations according to the present invention would therefore be as follows:

Switch_ratio_1=Switch_count12/Switch_count11

Switch_ratio_2=Switch_count22/Switch_count11 where:
  Switch_ratio_1: switch ratio, two-sensor bank
  Switch_ratio_2: switch ratio, one-sensor bank
  Switch_count11: pre-catalyst sensor signal switch count, two sensor bank
  Switch_count12: post-catalyst sensor signal switch count, two sensor bank
  Switch_count22: post-catalyst sensor signal switch count, one sensor bank Note that although the present invention was described in terms of a two-bank, three-EGO sensor system, as shown in FIG. 4, it is contemplated and should be understood that this invention can also be used in connection with a well-known two-bank four-EGO sensor system, as shown in FIG. 2, for purposes of compensating for a degraded pre-catalyst EGO sensor in one of the banks. In such a system, known methods, such as the method described in U.S. Pat. No. 5,357,751 can be used to monitor the catalysts in both banks while all four EGO sensors are operating properly. In the event that one of the pre-catalyst EGO sensors degrades, and if the degradation is detected by the system, the invention compensates for the degraded EGO sensors by conducting the switch ratio calculation using only three switch count measurements.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A system for monitoring catalyst operation in an engine having a first catalyst and a second catalyst, comprising:
   a first exhaust sensor coupled to the first catalyst at a post-catalyst location, said first exhaust sensor monitoring exhaust passing only through the first catalyst, said first exhaust sensor generating a first signal;
   a second exhaust sensor coupled to a second catalyst at a pre-catalyst location, the second exhaust sensor generating a second signal; and
   a controller coupled to said first and second exhaust sensors for calculating a first diagnostic signal corresponding to the operation of the first catalyst,
   wherein the controller calculates the first diagnostic signal from the first and second signals.

2. A method for monitoring catalyst operation in an engine having a first catalyst and a second catalyst, comprising:
   generating a first signal from a first exhaust sensor coupled to the first catalyst at a post-catalyst location such that said first exhaust sensor monitors exhaust passing only through the first catalyst;
   generating a second signal from a second exhaust sensor coupled to a second catalyst at a pre-catalyst location; and
   calculating at least a first diagnostic signal corresponding to the operation of the first catalyst from the first and second signals.

3. A system for monitoring catalyst operation in an engine having a first catalyst and a second catalyst, comprising:
   a first EGO sensor coupled to the first catalyst at a post-catalyst location, said first EGO sensor monitoring exhaust passing only through the first catalyst, said first EGO sensor generating a first signal;
   a second EGO sensor coupled to a second catalyst at a pre-catalyst location, the second EGO sensor generating a second signal; and
   a controller coupled to said first and second EGO sensors for calculating a first diagnostic signal corresponding to the operation of the first catalyst,
   wherein the controller calculates the first diagnostic signal from the first and second signals.

4. The system of claim 3, wherein the first signal has a first switch count, the second signal has a second switch count, and the first diagnostic signal is a first switch ratio of the first and second switch counts.

5. The system of claim 4, wherein the first switch count ratio for the first catalyst is the first switch count divided by the second switch count.

6. The system of claim 4, further comprising a third EGO sensor coupled to the second catalyst at a post-catalyst location, the third EGO sensor generating a third signal,
   wherein the controller calculates a second diagnostic signal for the second catalyst from the second and third signals.

7. The system of claim 6, wherein the third signal has a third switch count and the second diagnostic signal is a second switch ratio of the second and third switch counts.

8. The system of claim 7, wherein the first switch ratio for the first catalyst is the first switch count divided by the second switch count, and wherein the second switch ratio for the second catalyst is the third switch count divided by the second switch count.

9. A method for monitoring catalyst operation in an engine having a first catalyst and a second catalyst, comprising:
   generating a first signal from a first EGO sensor coupled to the first catalyst at a post-catalyst location such that said first EGO sensor monitors exhaust passing only through the first catalyst;
   generating a second signal from a second EGO sensor coupled to a second catalyst at a pre-catalyst location; and
   calculating at least a first diagnostic signal corresponding to the operation of the first catalyst from the first and second signals.

10. The method of claim 9, wherein the first signal has a first switch count, the second signal has a second switch count, and the first diagnostic signal is a first switch ratio of the first and second switch counts.

11. The method of claim 10, wherein the first switch ratio for the first catalyst is the first switch count divided by the second switch count.

12. The method of claim 9, further comprising the steps of:

generating a third signal from a third EGO sensor coupled to the second catalyst at a post-catalyst location, and calculating at least a second diagnostic signal corresponding to the operation of the second catalyst from the second and third signals.

13. The method of claim 12, wherein the first, second, and third signals have first, second and third switch counts, respectively, and wherein the first diagnostic signal is a first switch ratio of the first and second switch counts and the second diagnostic signal is a second switch ratio of the second and third switch counts.

14. The method of claim 13, wherein the switch ratio for the first catalyst is the first switch count divided by the second switch count, and wherein the switch ratio for the second catalyst is the third switch count divided by the second switch count.

* * * * *